Patented June 9, 1931

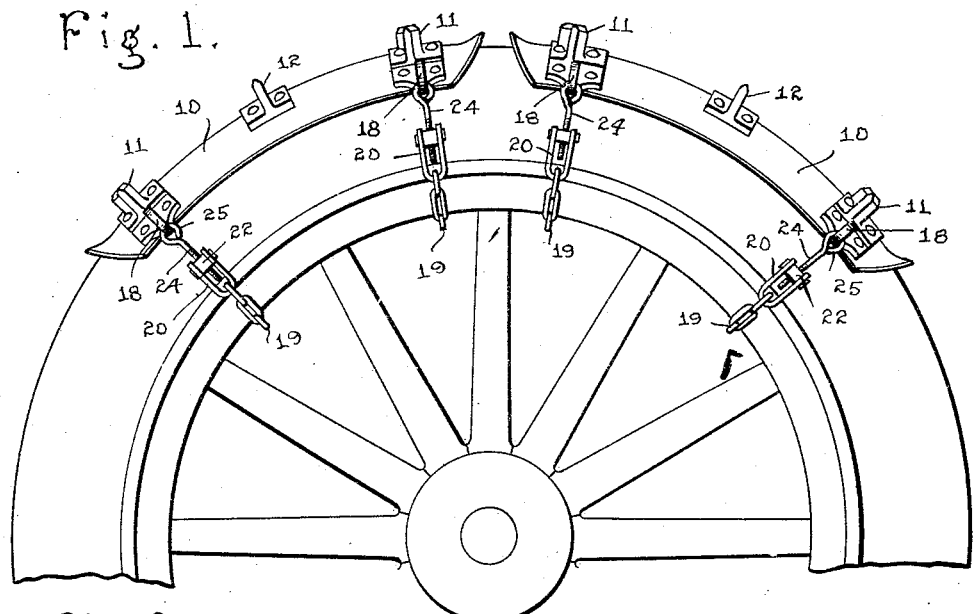
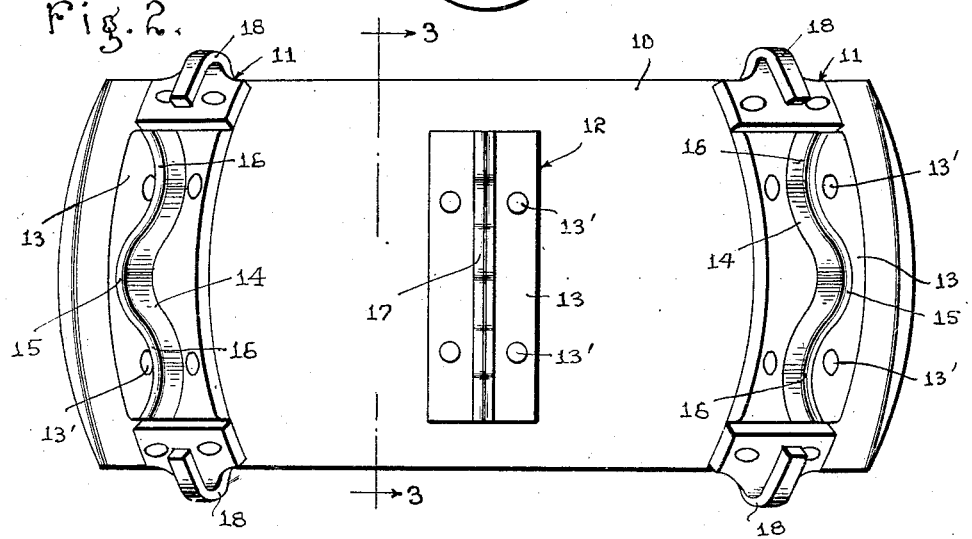
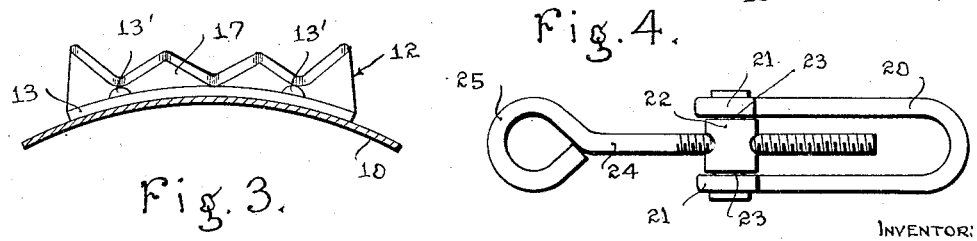

1,809,782

UNITED STATES PATENT OFFICE

DAVID E. HOFFMAN, OF MARQUETTE, MICHIGAN, ASSIGNOR TO NICHOLAS J. MARKS AND GEORGE KROMIDAS, BOTH OF MARQUETTE, MICHIGAN

TRACTION SHOE

Application filed June 21, 1929. Serial No. 372,706.

The present invention relates to a traction shoe for automobile tires.

The main object of the invention is the provision of a traction shoe arranged to materially increase the traction of the tire on icy or slippery surfaces or in mud, sand or snow, as well as to prevent side-slipping or skidding.

A further object of the invention is the provision of improved means for attaching the shoe to the wheel, said means being adjustable to facilitate attachment of the shoe to the tire and to permit the shoe to be secured with ease and convenience to wheels and tires of different sizes.

Another object of the invention is to provide a traction shoe which is simple in construction and durable in use and low in cost.

These and other objects of the invention, which may hereinafter appear, are attained in the construction of which the preferred embodiment will be described presently, it being understood that, while this construction is to be preferred, certain changes may be made and that such changes are to be considered as part of the present invention and within the scope of the appended claim.

For a complete understanding of the invention reference is to be had to the following description and the accompanying drawings in which:

Fig. 1 is a fragmentary side elevation of a vehicle wheel having a traction shoe secured in position on the tire;

Fig. 2 is a plan view of the traction shoe;

Fig. 3 is a section on the line 3—3 of Fig. 2, and

Fig. 4 is a fragmentary view of the adjustable attaching device.

The traction shoe comprises a metal plate 10 shaped to conform to the circumferential and transverse curvatures of the tire. End lugs 11 and an intermediate lug 12 are secured to the metal plate 10. Each of the lugs comprises a base portion 13 conforming to the curvature of the plate 10 and secured thereto preferably by rivets 13' to facilitate manufacture and assembly and to permit replacement of the lugs when necessary.

The base portions of the end lugs 11 have integral upstanding road engaging projections 14 which have a central curved portion 15 and reversely curved end portions 16. These upstanding projections curved as shown and described offer great resistance to prevent slipping of the tire in mud, sand or snow and also prevent side-slipping or skidding.

The base portion of the lug 12 has an integral upstanding projection 17 which is of saw-tooth formation to provide a plurality of road engaging members. This saw-tooth projection is particularly useful for engaging icy surfaces to thereby prevent the vehicle wheel from slipping.

Hook members 18 are secured to the metal plate 10 at both sides near the ends thereof by rivets or the like. Attaching chains 19 are adapted to be detachably secured to these hooks for holding the traction shoe on the tire. These attaching chains include U-shaped links 20. The ends 21 of each link are reflexed and curved to provide a bearing for a swivel pin 22. The swivel pin has grooves 23 within which the reflexed ends of the link are positioned whereby to hold the pin in place. A threaded pin 24 is adjustably associated with the swivel pin 22 by engaging a threaded aperture transversely through the swivel pin. The pin 24 has an eyelet 25 for engagement with the hook member 18 of the traction shoe.

The device as thus disclosed constitutes a highly satisfactory traction shoe. The lugs are especially advantageous in view of their construction which adapts them for service on roads which are either icy, muddy, or covered with snow or sand, or which are otherwise slippery. The attaching means also contributes to the success of the device in view of the adjustable feature which permits the quick attachment and detachment of the traction shoe. The construction of the metal plate and the separate lugs and attaching hooks secured thereto as described permits the shoe to be made at low cost because this construction greatly facilitates the casting of the parts and also permits the lugs to be made of different metal or differently treated metal. Also, as stated, when one or more lugs become worn or broken, they may be replaced at a cost considerably less than that of a new shoe.

Having thus described my invention what is claimed and desired to be secured by Letters Patent of the United States is:

A traction shoe for a vehicle tire comprising a metal plate conforming to the curvature of the tire, said shoe having traction increasing members thereon, and means for securing said shoe to the tire, comprising hooks carried by said shoe at each side, a chain adapted to engage the rim of the wheel underneath said shoe and the ends thereof connected with said hooks, said chain comprising a U-shaped link, a swivel pin pivotally mounted in the ends of said link, said swivel pin having a central transverse threaded aperture, and a threaded pin adjustably secured in said aperture and having an eyelet for engaging a hook on said plate, said swivel pin and threaded pin constituting means for automatic angular adjustment with relation to said U-shaped link whereby said threaded pin and U-shaped link can conform generally to the curvature of the side wall of the tire.

In witness whereof I hereunto affix my signature.

DAVID E. HOFFMAN.